March 12, 1957 R. H. SHEPPARD 2,784,656
TOOL BAR CARRIER AND COUPLING
Filed Dec. 12, 1950 4 Sheets-Sheet 4

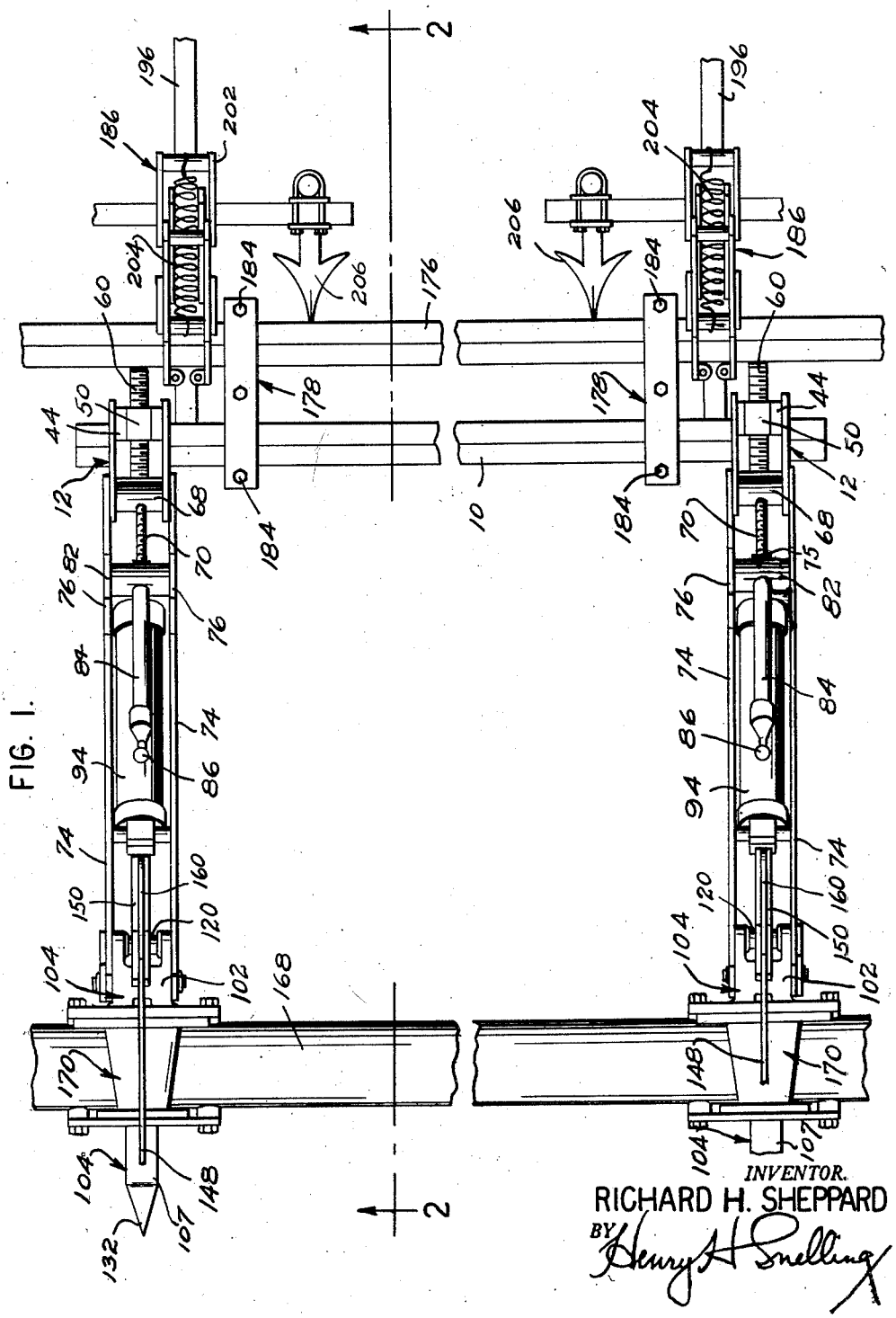

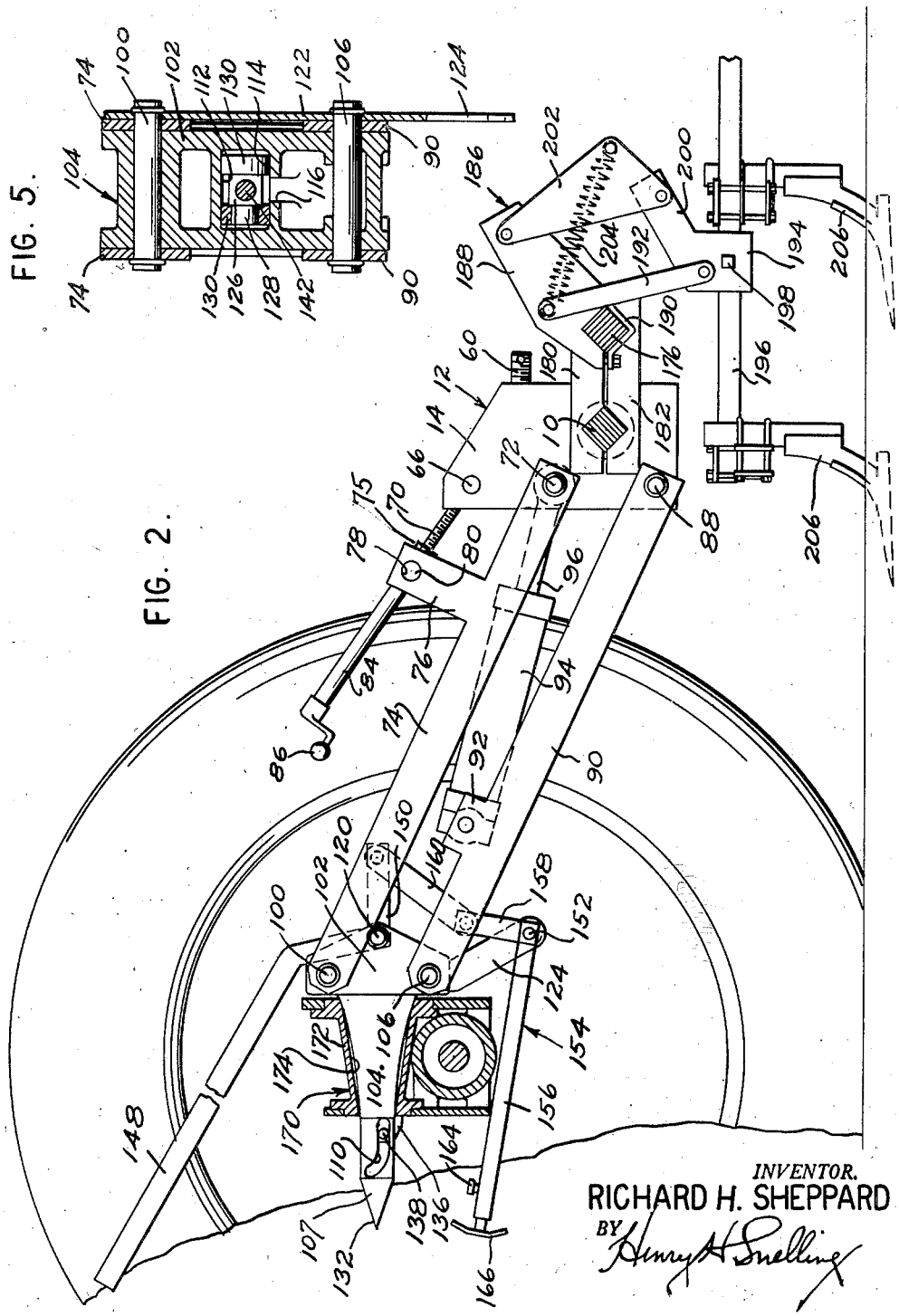

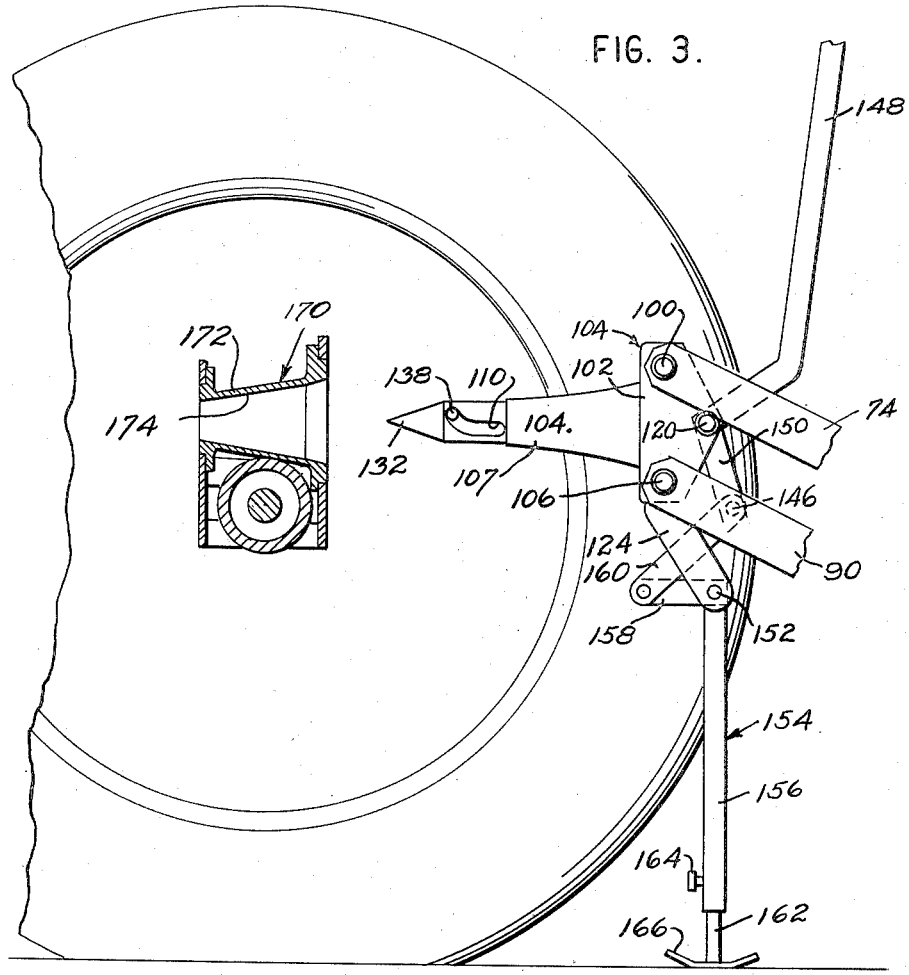
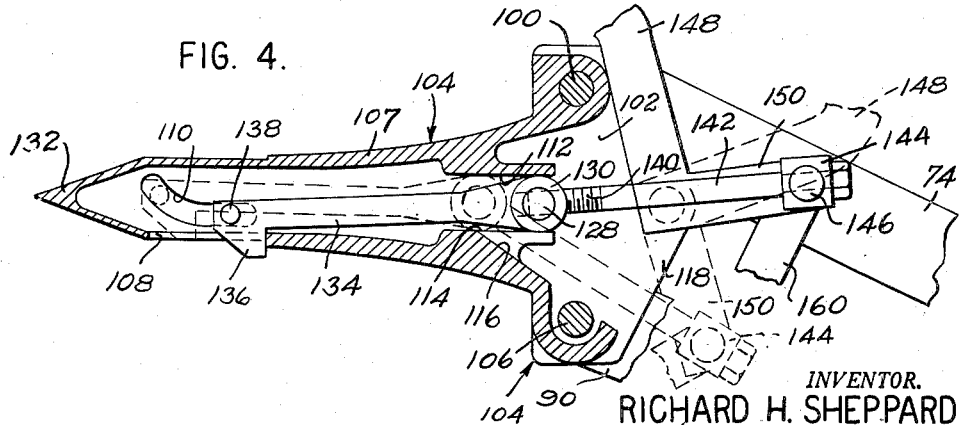

*INVENTOR.*
RICHARD H. SHEPPARD
BY Henry H. Snelling

United States Patent Office 2,784,656
Patented Mar. 12, 1957

2,784,656

TOOL BAR CARRIER AND COUPLING

Richard H. Sheppard, Hanover, Pa.

Application December 12, 1950, Serial No. 200,467

16 Claims. (Cl. 97—47.15)

This invention relates to a tool bar carrier and coupling by which farm implements or the like can be coupled to and carried by a conventional farm tractor.

With the high degree of development of farming practices time has become an important factor; in fact, farming in its current stage of development and its lack of adequate man-power demands that the best possible use be made of the time of the men engaged in such pursuit.

The principal object of this invention is to facilitate the rapid connection and disconnection of farming equipment to a farm tractor, and to maintain the tool bar level and at the desired depth.

Another object is to enable the operator of a farm tractor to effect the coupling and uncoupling of a piece of farming equipment to the tractor without leaving his seat on the tractor.

Still another object is to facilitate the adjustment of the earth working implements relative to the ground so as to enable their working angle or depth to be varied by the operator without the use of gage wheels.

A further object is to enable the tractor operator so to control the tool bar that it may be held parallel with or tilted to a desired angle relative to the ground and hence render the device useful in terracing.

A still further object is to avoid interference between the tool bar supporting means and the implement clamps by which implements are coupled to the tool bar.

A further important object is to protect the implements carried by the tool bar from becoming injured or broken through collision or contact with an immovable object during the advance of the implements by the tractor.

The above and other objects may be attained by employing this invention which embodies among its features, a coupler adapted to detachably connect farming tools to a farm tractor, links pivotally connected to the coupler, means connected to the links for moving said links in vertical arcs, a tool carrier carried by the links for movement therewith, and implements carried by the carrier for movement therewith.

Other features include means carried by the tool carrier for altering the positions of the implements relative thereto and with relation to the ground, and means carried by the tool carrier and supporting the implements to permit said implements to yield and move upwardly when an immovable object is encountered.

In the drawings:

Figure 1 is a top plan view of the tool bar carrier and coupling means connected to the axle of a conventional farm tractor.

Figure 2 is a vertical sectional view taken on line 2—2 of Figure 1.

Figure 3 is a view showing the tool bar carrier and coupling means disconnected from the tractor.

Figure 4 is a vertical longitudinal sectional view through the coupling tongue of the tool bar carrier.

Figure 5 is a transverse vertical sectional view through the coupling tongue.

Figure 6:
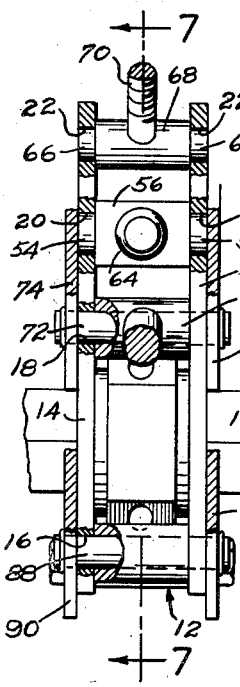
Figure 6 is a front end view of the tool bar carrier showing portions thereof broken away more clearly to illustrate certain details of construction.

The general assembly is shown in Figs. 1 and 2. At the left is the usual axle housing 168 of a tractor. Bolted to this are two socket members 170 which detachably receive the bayonet members 104 pivoted to the pairs of parallel bars 74 and 90 which mount at their rear ends by carriers 12, the first tool bar 10 and the longer and parallel main tool bar 176 on which are secured a number of agricultural tools of any type as, for example, the listers 206. In the center of each set of four bars is a hydraulic cylinder 94. The two cylinders are independent so that the first or auxiliary bar 10 may be tilted as desired, as for example in terracing.

Referring now to sheet 4 of the drawings, the bar 10 of rectangular cross section is mounted adjacent opposite ends in spaced tool bar carriers designated generally 12 each of which comprises a pair of spaced parallel vertically disposed elongated plates 14. Each plate 14 is provided adjacent one vertical edge with a group of vertically spaced openings 16, 18, 20 and 22 and adjacent its opposite or rear edge with a relatively large opening 24. The respective openings 16, 18, 20, 22 and 24 of opposite plates 14 lie in axial alignment and mounted for rotation in the openings 24 of the plates 14 are cast-iron bushings designated 26, each comprising a circular disk 28 carrying adjacent one side an outstanding annular flange 30 and having extending axially therethrough a rectangular opening 32 through which extends the bar 10 previously referred to. It will thus be seen that the bar 10 may rotate about its longitudinal axis relative to the tool bar carriers 12.

Clamped to the bar 10 between each pair of plates 14 as by clamp members 34 and clamp screws 36 is a lever 38 which comprises an elongated body 40 having formed intermediate its ends a V-shaped notch 42 the walls of which engage adjacent faces of the bar 10 so that when the two levers 38 are moved the transverse bar 10 will be rotated about its longitudinal axis. Carried by the body 40 of each lever 38 and projecting from one end thereof in spaced parallel relation are longitudinally extending ears 44 which are pierced with aligning openings 46 for the reception of oppositely extending trunnions 48 of blocks 50. The trunnions 48 of each block 50 lie along an axis which lies parallel with the longitudinal axis of the bar 10 and each block 50 is provided with an internally screw threaded opening 52 which extends through its respective block along an axis which intersects and lies perpendicular to the axis of the trunnions 48. It will thus be seen that the blocks 50 may oscillate about an axis which lies parallel to the axis of the bar 10.

Mounted for oscillatory movement in the openings 20 of the plates 14 about an axis which lies parallel to the longitudinal axis of the bar 10 are trunnions 54 of blocks 56 each of which is provided with an opening 58 which lies along an axis which intersects and lies perpendicular to the axis of the trunnions 54. Mounted for rotation in the opening 58 of each block 56 is a screw 60 which has threaded engagement with the threaded opening 52 of an adjacent block 50. The screws 60 are held against longitudinal movement in their respective blocks 56 by shoulders 62 and heads 64. It will thus be seen that when the screws 60 are turned about their longitudinal axis, the levers 38 will be moved to cause the bar 10 to rock about its longitudinal axis.

Mounted for rocking movement in the openings 22 of each pair of plates 14 are the trunnions 66 of a block 68 from which projects laterally an externally screw threaded shank 70 the purpose of which will hereinafter appear, and extending through the openings 18 of each pair of plates 14 is a pivot pin 72 by means of which pairs of elongated links 74 are pivotally connected to each tool bar carrier 12.

Each link of each pair of links 74 is provided intermediate its ends with an upwardly extending arm 76 (Fig. 2) and extending through the arms 76 adjacent their upper ends are aligning openings 78 in which are received the trunnions 80 of bored blocks 82. Mounted for rotation and longitudinal movement in each block 82 in a smooth bore with an axis which intersects and lies perpendicular to the axis of its respective trunnions 80 of the bored block 82 is a sleeve 84 which carries at its rear end a collar-nut 75 having threaded engagement with the screw 70 turning in pivots 66 in the carrier 12. A hand crank 86 is carried by each sleeve 84 at the end thereof remote from its respective block 82 and it will thus be seen that as the hand crank 86 are turned the screw 70 is telescoped into the sleeve 84 as far as permitted by the collar 75 on the sleeve. This arrangement of collar and bored block provide a means for maintaining the tool bar level and at the desired depth without the use of gage wheels and by means of an adjustment accessible from the driver's seat. In terracing the driver also may operate the bars 10 and 176 at an angle to the ground level.

The depth is controlled and parallelism or angle with the ground is maintained by turning the crank handle 86 which positions the collar 75 axially along the screw 70 and forms a stop which the bored block 82 cannot pass over. As the bar 10 is lowered the handle 86 can readily be reached from the operator's position on the tractor. The stops 75 take the place of the little wheels used on small equipment and are useful with chisels and subsoilers which are not equipped with wheels and so need some sort of depth limiting stop. In other words, these stops are not only a depth control in which the rear wheels of the tractor determine the depth but they are also a leveling device as they can be adjusted independently. The screw 70 cannot turn about its own axis but pivots freely on the trunnions 66 of block 68, as best seen in figure 6. The collar 75 is a nut welded to the end of sleeve 84 so that both turn as a unit with handle 86. The stop 75 at any adjusted position along screw 70 limits downward movement of the associated carrier 12 but permits free upward movement thereof. The bushings have some clearance, the end play of these bushings is not too close, and the four flat steel bars are not torsionally very rigid, hence the accumulative effect allows any reasonable tilting without binding, that is up to six inches or eight inches or even more in the distance between the two carriers.

Figure 7:
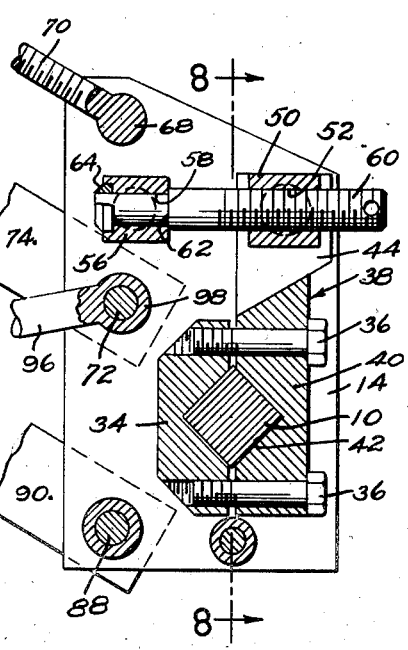
Figure 7 is a view taken on line 7—7 of Figure 6.
Figure 8:
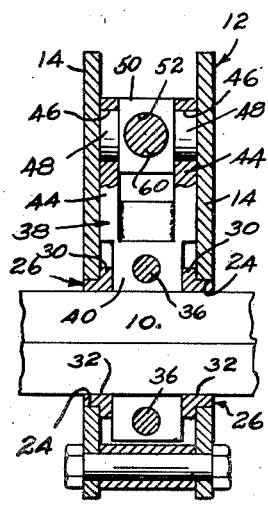
Figure 8 is a view taken on line 8—8 of Figure 7.
Figure 9:
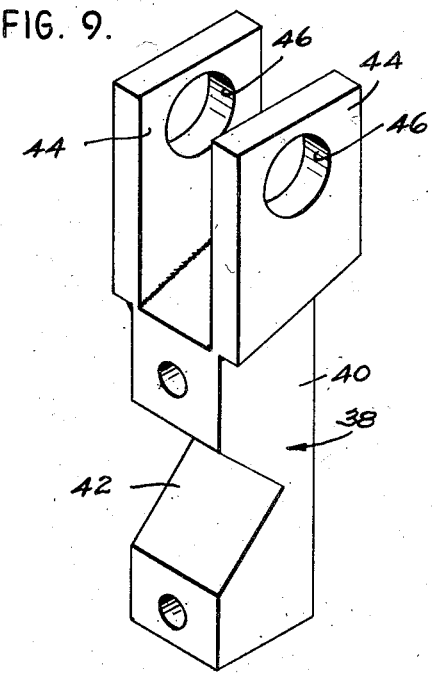
Figure 9 is a perspective view of the tool adjusting lever.
Figure 10:
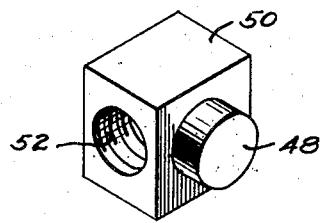
Figure 10 is a perspective view of the lever adjusting block.
Figure 11:
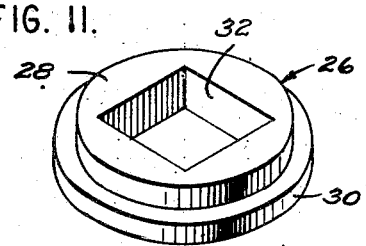
Figure 11 is a perspective view of one of the bar receiving bushings.

Extending through the openings 16 of each pair of plates 14 is a pivot pin 88 by means of which parallel links 90 are coupled to each tool bar carrier 12. Each link 90 is provided near the end thereof remote from its pivot pin 88 with an upstanding ear 92 and pivotally coupled to the ears 92 of each pair of links 90 is one end of an hydraulic cylinder 94. A piston rod 96 projects through the opposite end of each cylinder 94 and carries a transversely extending sleeve 98 (Figure 7) which surrounds the pivot pin 72 of an adjacent tool bar carrier 12. Hence as pistons contained within the cylinders 94 and connected to the piston rods 96 are moved, the links 90 will be moved about their pivots 88 and the links 74 will move about pivots 72.

Pivotally coupled by a pivot pin 100 at each pair of links 74 adjacent the ends thereof remote from the pivot pins 72 are the head portions 102 of tongues or bayonets designated 104. Similar pivot pins 106 connect the adjacent pairs of links 90 to the head portions 102 in spaced relation to the links 74 so that as the links 74 and 90 move about their respective pivot pins 72 and 88 the tongues 104 and the tool bar carrier 12 will retain the same relative angular position. Integral with the head portion 102 of each bayonet 104 is a tongue portion 107 which comprises an elongated hollow tapered body of rectangular cross section having in its bottom or under side adjacent its end remote from the head portion 102 a longitudinally extending slot 108 the purpose of which will hereinafter appear. Said central or tongue portion is also provided in opposite side walls with registering elongated longitudinal slots 110 which curve upwardly as they recede from the rear or head portion 102. Formed within the central portion 107 of each bayonet 104 adjacent the junction of the tongue portion 107 with the head portion 102 thereof are opposed top and bottom guide walls 112 and 114 respectively. The bottom wall 114 has opening therethrough a central groove 116 which increases in depth as it approaches the head portion 102, and extending from the head portion 102 on opposite sides thereof to the rear or in a direction opposite the tongue portion 107 are parallel side flanges 118 which are provided adjacent their edges remote from the head portion 102 with aligned openings for the reception of a pivot pin 120. Supported on one side of each head portion 102 by the pivot pins 100 and 106 is a plate 122 (Figure 5) carrying at its lower end a downwardly and rearwardly extending bracket arm 124.

Mounted within the central portion 107 of the bayonet 104 adjacent the head portion 102 is a cross head 126 having laterally extending trunnions 128 upon which are mounted for rotation rollers 130 which ride between the walls 112 and 114, and fixed to the cross head 126 and projecting laterally therefrom toward the apex 132 of the tongue portion 107 is a latch bar 134 carrying adjacent its end remote from the cross head 126 a downwardly extending latch member 136 which rides in the slot 108. A cross pin 138 extends through the latch bar 134 and rides in the two slots 110 so that when the latch bar 134 is advanced toward the apex 132 of the tongue portion 107, the latch member 136 will be moved inwardly toward the axis of the tongue 104 and out of the slot 108.

The cross head 126 is provided in its rear side remote from the latch tongue with an internal screw threaded recess for the reception of the threaded end 140 of an actuating rod 142, the opposite end of which is mounted in a block 144 for rotation about its longitudinal axis. The rod 142 is, however, held in said block 144 against longitudinal movement relative thereto. Carried on opposite ends of the block 144 are trunnions 146 which align axially and pivotally support the block in an actuating lever arm to be more fully hereinafter described.

Mounted for rocking movement on the pivot pin 120 at the rear of the latch housing is an actuating lever 148 carrying a bifurcated arm 150 having aligning openings therein for the reception of the trunnions 146 of the block 144. It will thus be seen that as the lever 148 is moved about the axis of the pivot pin 120, the latch member 134 will be moved longitudinally within the bayonet or latch housing 104. Pivotally mounted as at 152 on the bracket arm 124 is a stand designated generally 154 which comprises a tubular column 156 carrying adjacent its pivot pin 152 a laterally extending actuating lever 158 which is coupled to the lever arm 150 by a link 160. Hence when the lever arm 150 moves with the lever 148, the stand 154 will also move about its pivotal connection 152 with the bracket arm 124.

A leg 162 telescopically enters the tubular column 156 at the end thereof remote from the pivot 152 and is held in adjusted position therein in any suitable manner as by a set screw 164. A foot 166 is carried by the leg 162 at the outer end thereof to provide a broad resting surface when the stand is in implement supporting position.

Fixed in any suitable manner to the axle housing 168 of a conventional farm tractor is a pair of spaced socket members designated generally 170 each of which comprises a tapered body portion 172 having a tapered transversely rectangular opening 174 extending therethrough. The smaller end of the opening 174 is disposed toward the front end of the tractor so that by driving the tractor backwards, the socket members 170 when aligned with the coupling means 104 may be easily penetrated by the bayonets.

With the structure so far described detachably coupled by the bayonets 104 and socket members 170 to a conventional farm tractor carrying an hydraulic power system, and opposite ends of the cylinders 94 independently coupled to the hydraulic system it will be evident that by admitting hydraulic fluid under preassure to the cylinders 94, the bar 10 and any tools carried thereby will be elevated for transportation and may be lowered into working position by reversing the flow of the hydraulic fluid through the cylinders 94. Also by arresting the flow of hydraulic fluid through the cylinders, the bar 10 and tools carried thereby may be held at any desired level within the limits of the device.

In order to couple a main tool bar 176 to the first or auxiliary bar 10 I provide clamps shown in Figs. 1 and 2 designated generally 178 each of which comprises a top clamping member 180 and a bottom clamping member 182 which are provided in their adjacent faces with V-shaped notches in which the bars 10 and 176 are received. Suitable clamp bolts 184 extend through the clamping members 180 and 182 to draw the members tightly against the bars 10 and 176. The clamps 178 may be placed in any desired position longitudinally of the bars 10 and 176 so as to avoid interference with tool clamps by which the agricultural tools are held on the auxiliary tool bar 176.

In order to yieldingly support tools, such as cultivators or the like on the tool bar I employ a tool support designated generally 186 which comprises a pair of plates 188 carrying clamps 190 by which they are held in spaced parallel relation and in an upwardly and rearwardly extending position on the auxiliary tool bar 176. Pivotally connected to each plate 188 adjacent its forward end and above the clamp 190 are links 192 to which are pivotally connected adjacent their lower ends socket members 194 in which longitudinal tool bars 196 are held in any suitable manner as by set screws 198. An arm 200 is carried by the socket member 194 and projects upwardly and rearwardly therefrom and pivotally connected to the arm 200 on opposite sides thereof adjacent its rear end are links 202 which lie parallel to the links 192 and are pivotally connected adjacent their upper ends to the plates 188 adjacent the upper rear ends thereof. A retractile coiled spring 204 is anchored at one end between the plates 188 adjacent the upper ends of the links 192 and the opposite end of said coiled spring 204 is anchored to the links 202 intermediate the ends thereof. The tension of the spring 204 is such that it yieldingly holds the forward links 192 against the tool bar 176 but will permit the socket member 194 to move upwardly and rearwardly should a tool 206 carried by the auxiliary tool bar 196 encounter an immovable object such as a stump or boulder, raising the bar 196 parallel to its initial position.

In use assuming that the coupling device is connected to a group of tools carried by the tool bar 176 and is at rest as illustrated in Figure 3, ready for coupling to a tractor, the hand levers 148 will be elevated substantially as shown and the tongues 104 will be held in a substantially horizontal position by the stands 154. Should it be desired to couple the tools to a tractor carrying the socket members 170, the tractor is backed toward the implement with the axes of the socket members 170 aligned with the tongues 104 until the latter penetrate the socket members 170 to a point two or more inches short of their terminal position. At this time the handle 148 may be brought forward moving the latch 136 out of the latch housing 107 in a downward and backward motion which tends to bring the latch housing 107 into firm contact with the socket 170. At the same time the stand 154—166 is brought up to a horizontal position through link 158. The lever 148 is pushed forward until the pin 138 has reached a position at a lower level than the center of pin 128. The screw 142 must be so adjusted that the elements of the linkage are slightly sprung thereby providing an over-center feature which prevents undesired disconnection.

With the device thus coupled to the tractor, the cylinders 94 are connected in any conventional manner with the hydraulic system of the tractor so that by admitting hydraulic fluid into the forward ends of the cylinders 94 the rear ends of the links 74 and 90 will be elevated, thus carrying the tool bar 176 and any tools mounted thereon upwardly to facilitate their transportation.

When using farm implements such as cultivators and where it is desired to protect the implements from injury when an immovable object is encountered, I mount on the tool bar 176 as many tool supports 186 as may be required and it is evident that as a tool supported by the socket member 194 of such a support 186 engages an immovable object, the spring 204 will yield and allow the tool to move upwardly and rearwardly to clear the object. In such movement the bars 196 will remain constantly parallel to their initial position.

What I claim is:

1. The combination with a tractor housing, of a socket secured thereto so as to have its center line parallel to the ground, a pair of parallel linkages, a tongue pivotally connected to the forward ends of the linkages so as to maintain its center line parallel to the ground when the tongue is elevated or lowered, a latch slidable generally horizontally within the tongue moving in a curved path to project beyond the margin of the tongue for locking the tongue to the socket, and a plurality of elements located convenient to the operator of the tractor while driving for moving said latch into and out of latching position.

2. In combination, a tractor housing, a socket secured thereto with its center line parallel to the ground, a pair of parallel linkages, a tongue pivotally connected to the linkages to hold the tongue parallel to the ground as the tongue is elevated or lowered, a latch for locking the tongue to the socket, means for moving the latch into and out of locking postion, a stand for supporting the tongue in position to enter the socket, and a lever, forming a portion of the means, for raising the stand as the tongue is locked to the socket, the free end of the lever being positioned conveniently to the operator of the tractor.

3. Means for detachably coupling an implement to a farm tractor, said means comprising a socket member carried by the axle housing of the tractor, said socket member having an opening extending therethrough which lies parallel to the direction of travel of the tractor, a hollow tongue carried by an implement and projecting forwardly therefrom for penetration through the socket member, said tongue having a pair of parallel guideways at the rear thereof, a slot in the bottom wall near the front thereof, and an arcuate slot in a side wall, a latch bar guided in the arcuate slot at its front end and between the guideways at its rear end, a latch on the bar adapted to project through the slot in the bottom wall as the latch bar is moved rearwardly, and means for moving the latch bar forwardly to withdraw the latch and for moving the latch bar rearwardly to project the latch through the slot and into engagement with the socket member.

4. Means for detachably coupling an implement to a farm tractor, said means comprising a socket member carried by the axle housing of the tractor, said socket member having a rearwardly flaring opening extending therethrough which lies parallel to the direction of travel of the tractor, a tapered hollow tongue carried by an implement and projecting forwardly therefrom for penetration through the socket member, a latch slidable inside of the tongue and manually controlled means for rocking the latch into and out of the tongue for engaging the smaller end of the socket member and detachably connecting the tongue to the socket member, said means including an adjustable link and a cross head pivotally joining the link to the latch.

5. Means for detachably coupling an implement to a farm tractor, said means comprising a socket member carried by the axle housing of the tractor, said socket member having a rearwardly flaring opening extending therethrough which lies parallel to the direction of travel of the tractor, a tongue carried by an implement and projecting forwardly therefrom for penetration through the socket member, a latch carried by the tongue for engaging the forward face of the socket member and detachably connecting the tongue to the socket member, and manually controlled means carried by the tongue and connected to the latch for moving said latch into and out of engagement with the forward face of the socket member, said means including a pivoted lever convenient to the tractor driver, a link joining the lever to the latch, and means for causing the latch to move inside of the tongue as the link moves forwardly as the lever moves about its pivot to detach the implement from the tractor.

6. Means for detachably coupling an implement to a farm tractor, said means comprising a socket member carried by the axle housing of the tractor, said socket member having an opening extending therethrough which lies parallel to the direction of travel of the tractor, a hollow tongue carried by an implement and projecting forwardly therefrom for penetration through the socket member, means rockable within the tongue for engaging the socket member and detachably connecting the tongue to the socket member, manually controlled mechanism carried by the tongue for moving said rockable means, a stand carried by the tongue for movement into and out of a vertical tongue supporting position and operatively connected with the manually controlled means for movement in unison therewith.

7. Means for detachably coupling an implement to a farm tractor, said means comprising a socket member carried by the axle housing of the tractor, said socket member having an opening extending therethrough which lies parallel to the direction of travel of the tractor, a tongue carried by an implement and projecting forwardly therefrom for penetration through the socket member, a latch carried by the tongue for engaging the socket member and detachably connecting the tongue to the socket member, a stand carried by the tongue for movement into and out of a vertical tongue supporting position, and means connected to the stand and to the latch in convenient position for movement by the tractor operator for moving the stand to vertical position as the latch moves to release the tongue from the socket member.

8. Means for detachably coupling an implement to a farm tractor, said means comprising a socket member carried by the axle housing of the tractor, said socket member having an opening extending therethrough which lies parallel to the direction of travel of the tractor, a tongue carried by an implement and projecting forwardly therefrom for penetration through the socket member, a latch carried by the tongue for engaging the socket member and detachably connecting the tongue to the socket member, a stand carried by the tongue for movement into and out a vertical tongue supporting position and means connected to the stand and to the latch for moving the stand to vertical position as the latch moves to release the tongue from the socket member, said means comprising a manually operated lever convenient to the tractor operator pivotally connected to the tongue and operatively connected to the latch for disengaging the latch from the socket member and moving the stand to vertical tongue supporting position.

9. In a tractor carried agricultural tool having sets of parallel links pivoted at their free ends to a coupler for attachment to a tractor and at their rear ends to a tool carrier at each side of a tool bar, a leveling and depth adjusting means comprising a screw pivoted to the carrier, a block pivoted with respect to one of the links, a sleeve sliding freely in the block and having threaded engagement with the screw, a collar on the sleeve and a handle on the sleeve on the side opposite the collar, whereby the collar forms an adjustable stop for movement of the sleeve in the block.

10. A tool bar coupling tongue including a hollow tapered tongue portion having a slot in its bottom wall, a head portion at the larger end of the tongue portion, means adjacent the top and bottom of the head portion for connecting tool supporting bars thereto, a pair of spaced parallel runways at the junction of the tongue and head portions, a latch bar mounted on the runways for movement longitudinally relative to the tongue portion, a latch depending from the bar for projection through said slot, means for raising the latch as the latch bar moves forwardly and for lowering the latch as the latch bar moves rearwardly, and a member forming a toggle with the latch bar for moving the latch bar longitudinally between the runways.

11. In combination, a tool bar, four parallel links of an agricultural implement support, means for securing the forward ends of the parallel links to a coupler for securing the agricultural implement to a tractor, a tool bar carrier pivoted to the four links and comprising a pair of parallel plates, a pair of disks pivoted thereto and adapted to receive therethrough the tool bar, a lever clamped to the tool bar and therefore pivotally mounted in the plates, a screw pivotally carried by the carrier and freely turning axially in its pivot, a threaded block carried by the free end of the lever and having threaded engagement with the screw, whereby by turning the screw the angular position of the tool bar in the carrier may be altered; and means carried in part by the links and in part by the carrier for limiting approach of the parallel links together and consequently limiting the descent of the carrier as it pivots about the coupler.

12. In a tool bar carrier a pair of spaced parallel plates, said plates having aligned openings extending therethrough, bushings mounted in said openings for rotary movement relative to the plates, a bar mounted in said bushings for movement therewith relative to the plates, a lever fast to the bar to move about the axis of the bushings and a manually adjustable screw pivotally carried by the plates and having threaded engagement with the lever for adjusting the angular relation of the bar relative to the plates.

13. In a tool bar carrier a pair of spaced parallel plates, said plates having aligning openings extending therethrough, bushings mounted in said openings for rotary movement relative to the plates, a bar mounted in said bushings for movement therewith relative to the plates, tool bar supporting means carried by the bar, a lever mounted on the bar between the plates, said lever being movable with the bar, an internally screw threaded socket carried by the lever for rocking movement about an axis which lies parallel with the axis of the bar, a screw mounted between the plates for rocking movement about an axis which lies parallel to the axis of the bar, and said screw being rotatable about its longitudinal axis and threadedly engaging the threads of the socket.

14. The device of claim 9 in which each set of links has a leveling and adjusting means independent of the other similar means.

15. The combination with a tractor axle housing having thereon two spaced sockets each with its center line parallel to the ground and to each other, two sets of four parallel links, a tongue pivotally connected to each of the four links of its set of links so the center lines of the two tongues are held parallel to the ground, means slidable within each tongue for locking the tongue to its socket, and manually controlled mechanism including a lever in convenient position for movement by the tractor operator and moving the tongue locking means.

16. The combination of a tractor housing having two spaced tapering sockets on the housing with the axes of the sockets parallel to the movement of the tractor, with a tool bar, two spaced carriers loosely carrying the tool bar to turn about an axis transversely of the tractor, a set of four elongated slender resilient parallel links pivoted to each carrier, a head for each set of links to which the four links of the set are pivoted, individual power means for moving the parallel links of each set from or nearer to each other to raise and lower the carriers with respect to the heads, each head carrying a forwardly extending tongue for insertion into the tractor carried socket and an adjustable limiting means connecting each carrier with a link of its set of links permitting free upward movement of the carrier but limiting downward movement of its carrier, whereby when the tongues are in the sockets the limiting means governs the tilt of the tool bar with relation to the ground over which the tractor moves, as in terracing.

References Cited in the file of this patent

UNITED STATES PATENTS

| | | |
|---|---|---|
| 826,418 | Furr | July 17, 1906 |
| 1,098,281 | Mayer | May 26, 1914 |
| 1,128,283 | Barnard | Feb. 16, 1915 |
| 1,333,384 | Buller | Mar. 9, 1920 |
| 1,341,539 | Brown | May 25, 1920 |
| 1,464,740 | Benjamin et al. | Aug. 14, 1923 |
| 1,571,102 | Still | Jan. 26, 1926 |
| 1,864,639 | Crezee | June 28, 1932 |
| 1,906,430 | Strehlow | May 2, 1933 |
| 2,169,917 | Keeler | Aug. 15, 1939 |
| 2,228,490 | Smith | Jan. 14, 1941 |
| 2,247,367 | Frudden et al. | July 1, 1941 |
| 2,256,310 | Braley et al. | Sept. 16, 1941 |
| 2,307,436 | Wadelton et al. | Jan. 5, 1943 |
| 2,391,224 | Carter | Dec. 18, 1945 |
| 2,420,725 | Riggins | May 20, 1947 |
| 2,452,829 | Blaydes | Nov. 2, 1948 |
| 2,492,573 | Hearron | Dec. 27, 1949 |
| 2,503,468 | Carey | Apr. 11, 1950 |
| 2,522,702 | Charley | Sept. 19, 1950 |
| 2,562,318 | Lewis | July 31, 1951 |
| 2,567,736 | Silver | Sept. 11, 1951 |
| 2,580,545 | Hill | Jan. 1, 1952 |
| 2,593,679 | Kaupke | Apr. 22, 1952 |

FOREIGN PATENTS

| | | |
|---|---|---|
| 565,009 | France | Nov. 2, 1923 |
| 903,210 | France | Jan. 8, 1945 |